(12) United States Patent
Takai et al.

(10) Patent No.: US 12,158,719 B2
(45) Date of Patent: Dec. 3, 2024

(54) SHEET LAMINATOR AND IMAGE FORMING SYSTEM INCORPORATING THE SHEET LAMINATOR

(71) Applicants: Naoki Takai, Tokyo (JP); Keisuke Sugiyama, Kanagawa (JP); Yuichiro Kato, Kanagawa (JP); Kazuki Shimodate, Kanagawa (JP); Shota Yoshida, Kanagawa (JP); Takaya Ochiai, Kanagawa (JP); Yosuke Saito, Kanagawa (JP)

(72) Inventors: Naoki Takai, Tokyo (JP); Keisuke Sugiyama, Kanagawa (JP); Yuichiro Kato, Kanagawa (JP); Kazuki Shimodate, Kanagawa (JP); Shota Yoshida, Kanagawa (JP); Takaya Ochiai, Kanagawa (JP); Yosuke Saito, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 18/206,621

(22) Filed: Jun. 7, 2023

(65) Prior Publication Data
US 2023/0400806 A1    Dec. 14, 2023

(30) Foreign Application Priority Data

Jun. 13, 2022 (JP) .................................. 2022-095011
Apr. 6, 2023 (JP) .................................. 2023-061817

(51) Int. Cl.
G03G 15/00   (2006.01)
B32B 37/00   (2006.01)
(Continued)

(52) U.S. Cl.
CPC ..... *G03G 15/6582* (2013.01); *B32B 37/0053* (2013.01); *B32B 37/06* (2013.01);
(Continued)

(58) Field of Classification Search
CPC .. G03G 15/6582; G03G 15/70; G03G 15/703; G03G 2215/00548;
(Continued)

(56) References Cited

U.S. PATENT DOCUMENTS 7,720,414 B2 *  5/2010  Kubo ................. G03G 15/2028
                                                        399/124
11,851,301 B2 * 12/2023  Nozaki ................ B32B 37/142
(Continued)

FOREIGN PATENT DOCUMENTS

JP   2005-238796   9/2005
JP   2006-276557   10/2006

*Primary Examiner* — Sophia S Chen
(74) *Attorney, Agent, or Firm* — XSENSUS LLP

(57) ABSTRACT

A sheet laminator includes a fuser pressure member, a conveyor, and a guide. The fuser pressure member thermally fixes a two-ply sheet and a sheet medium inserted between two sheets of the two-ply sheet. The conveyor conveys the two-ply sheet toward the fuser pressure member in a sheet conveyance direction. The guide guides the two-ply sheet in a sheet conveyance passage between the conveyor and the fuser pressure member. At least one of the fuser pressure member or the conveyor is operable to guide the two-ply sheet outside the sheet conveyance passage in response to an occurrence of an abnormal stop of the sheet laminator.

11 Claims, 11 Drawing Sheets

(51) Int. Cl.
- *B32B 37/06* (2006.01)
- *B32B 37/14* (2006.01)
- *B32B 37/18* (2006.01)
- *B32B 38/00* (2006.01)
- *B32B 41/00* (2006.01)

(52) U.S. Cl.
CPC .......... *B32B 37/142* (2013.01); *B32B 37/185* (2013.01); *B32B 38/145* (2013.01); *B32B 41/00* (2013.01); *G03G 15/70* (2013.01); *B32B 2037/0061* (2013.01); *B32B 2309/72* (2013.01); *B32B 2317/12* (2013.01); *B32B 2367/00* (2013.01)

(58) Field of Classification Search
CPC ........ G03G 2221/1675; B32B 37/0046; B32B 37/0053; B32B 37/06; B32B 37/142; B32B 37/185; B32B 38/145; B32B 41/00; B32B 2037/0061; B32B 2309/72; B32B 2317/12; B32B 2367/00; B32B 2401/04

See application file for complete search history.

(56) References Cited

U.S. PATENT DOCUMENTS

| | | |
|---|---|---|
| 2011/0248440 A1 | 10/2011 | Sugiyama et al. |
| 2011/0266738 A1 | 11/2011 | Furuhashi et al. |
| 2012/0146279 A1 | 6/2012 | Furuhashi et al. |
| 2012/0153556 A1 | 6/2012 | Sugiyama et al. |
| 2012/0267846 A1 | 10/2012 | Nakada et al. |
| 2012/0282004 A1 | 11/2012 | Furuhashi et al. |
| 2013/0113154 A1 | 5/2013 | Furuhashi et al. |
| 2013/0134659 A1 | 5/2013 | Konno et al. |
| 2013/0147105 A1 | 6/2013 | Sugiyama et al. |
| 2013/0228965 A1 | 9/2013 | Hoshino et al. |
| 2013/0236228 A1 | 9/2013 | Nagasako et al. |
| 2013/0270763 A1 | 10/2013 | Furuhashi et al. |
| 2014/0011656 A1 | 1/2014 | Niikura et al. |
| 2014/0062003 A1 | 3/2014 | Niitsuma et al. |
| 2014/0062005 A1 | 3/2014 | Suzuki et al. |
| 2014/0062016 A1 | 3/2014 | Watanabe et al. |
| 2014/0077436 A1 | 3/2014 | Hata et al. |
| 2014/0131938 A1 | 5/2014 | Satoh et al. |
| 2014/0203486 A1 | 7/2014 | Sugiyama et al. |
| 2014/0203488 A1 | 7/2014 | Hidaka et al. |
| 2015/0370202 A1* | 12/2015 | Kawaguchi ........ G03G 15/2028 399/322 |
| 2017/0248901 A1* | 8/2017 | Ueshima ............ G03G 21/1633 |
| 2022/0334523 A1* | 10/2022 | Akiyama .............. B32B 37/185 |

* cited by examiner

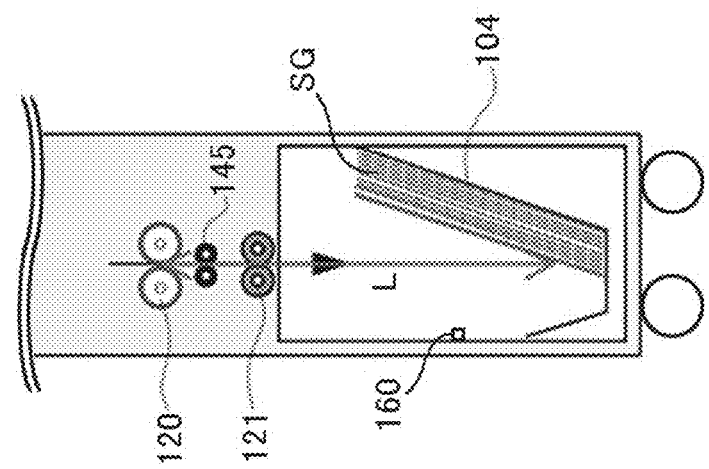
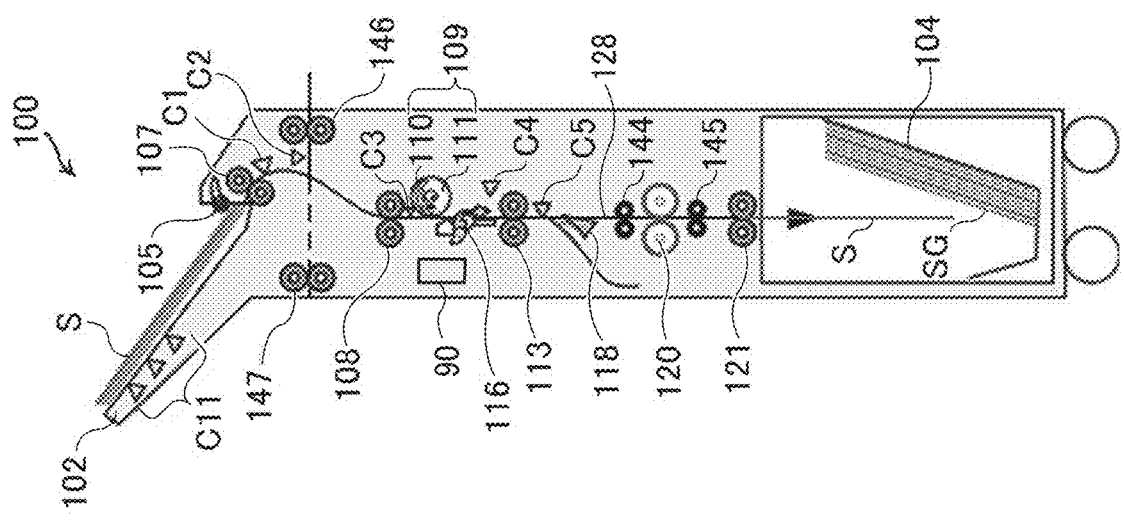

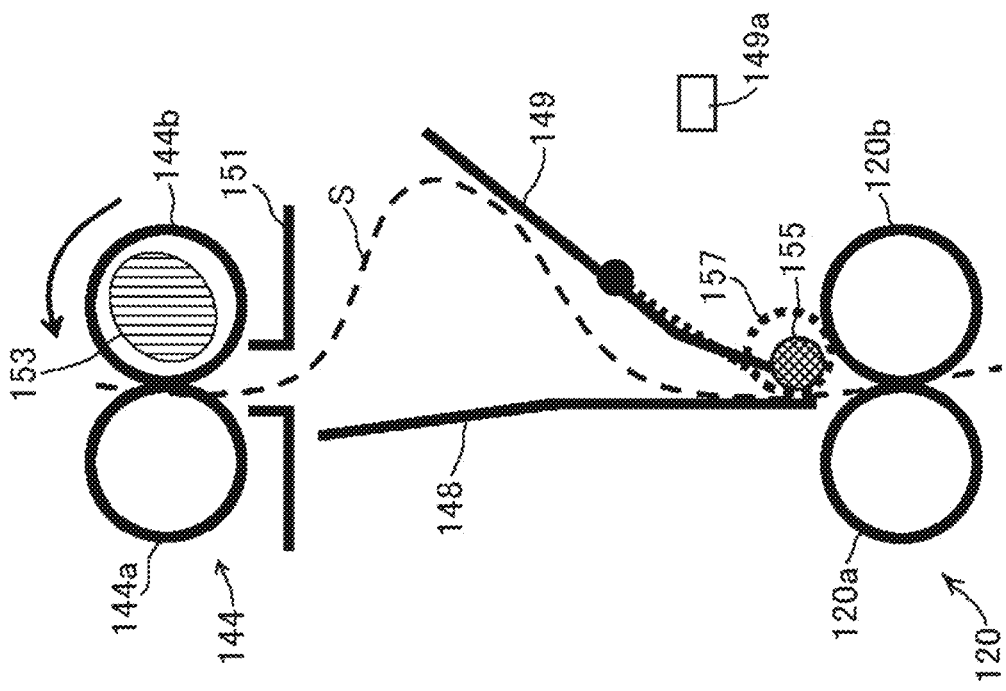
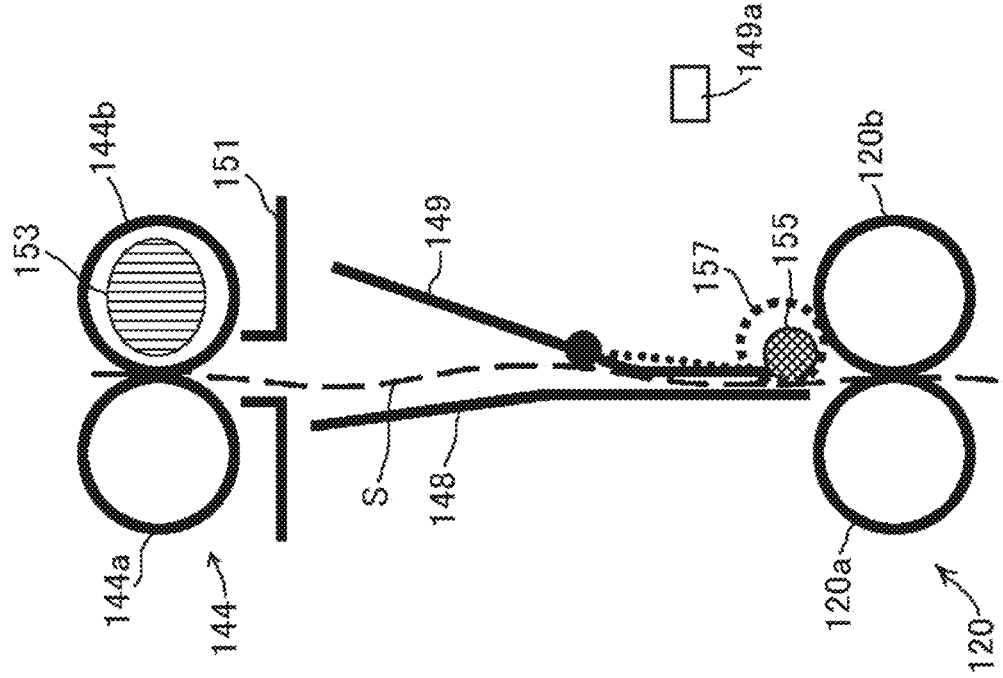

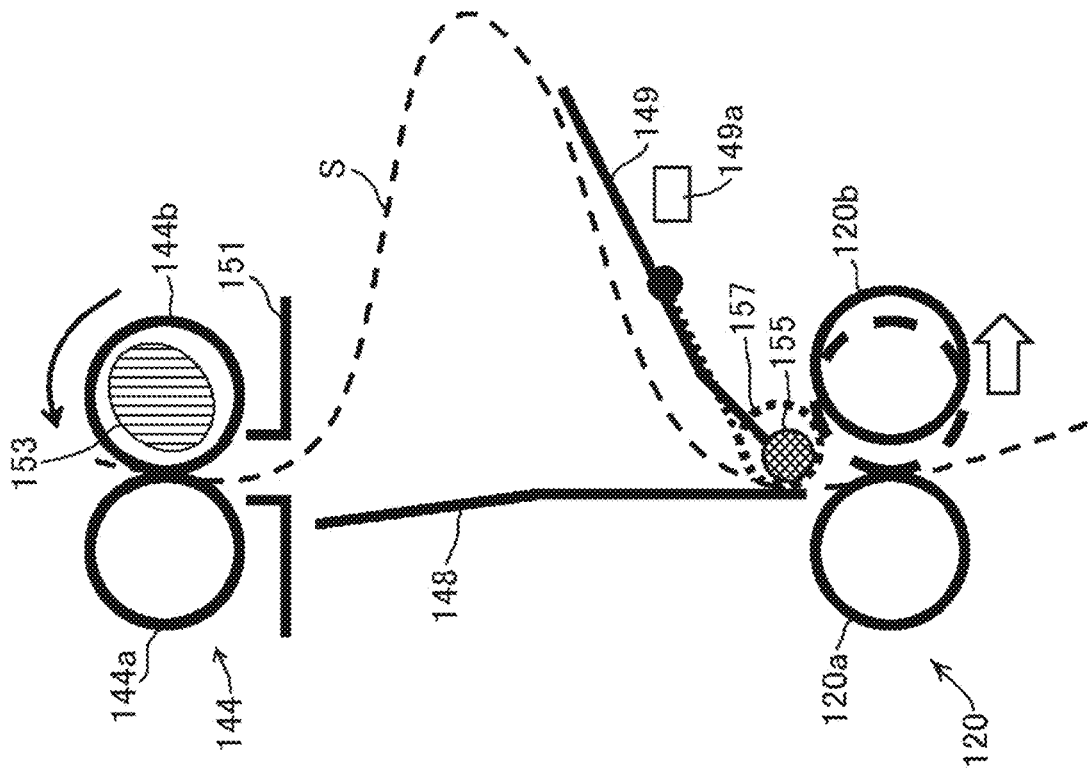
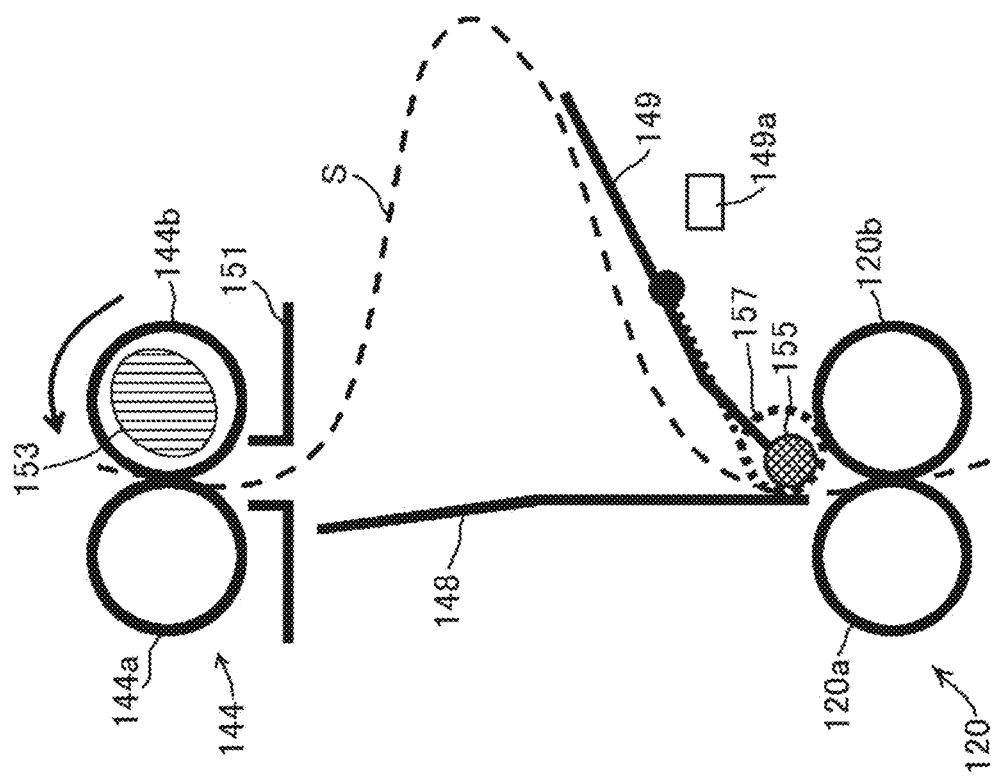

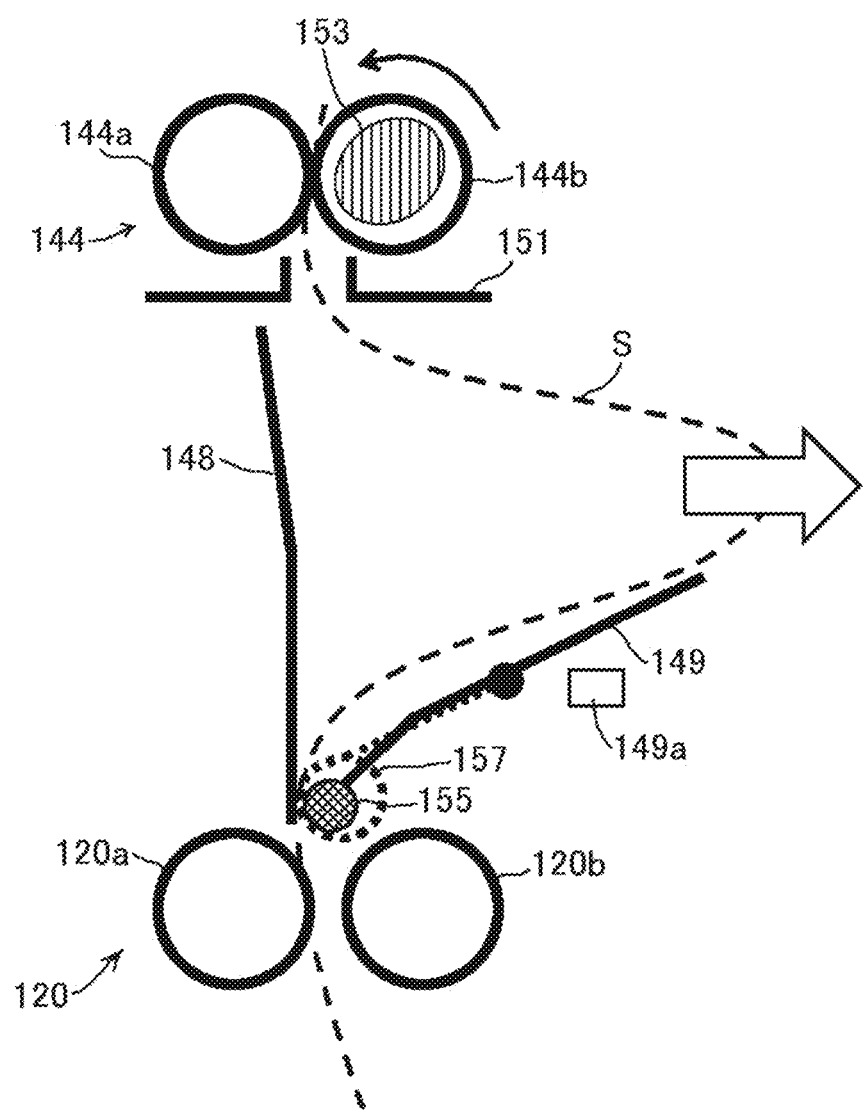

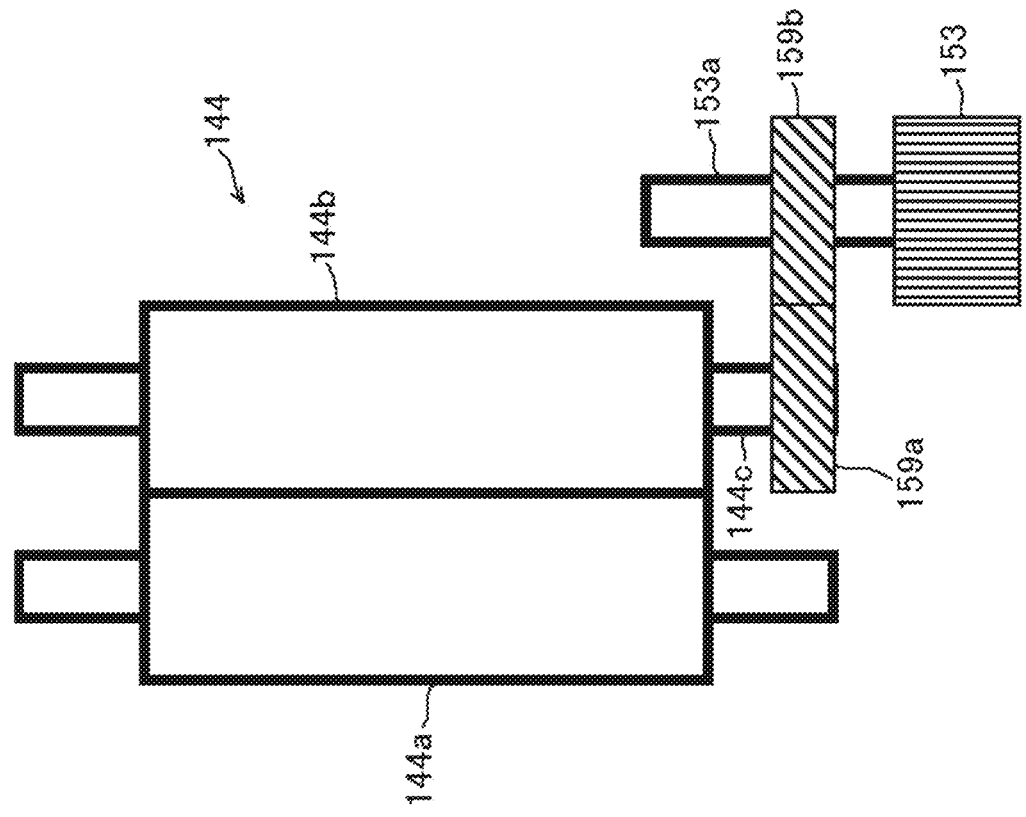
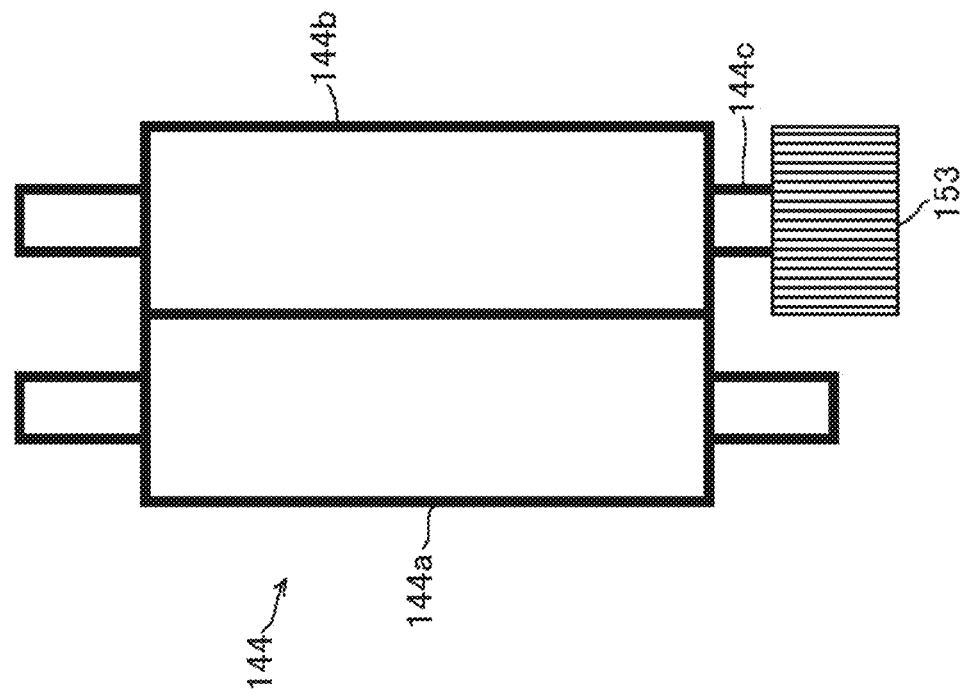

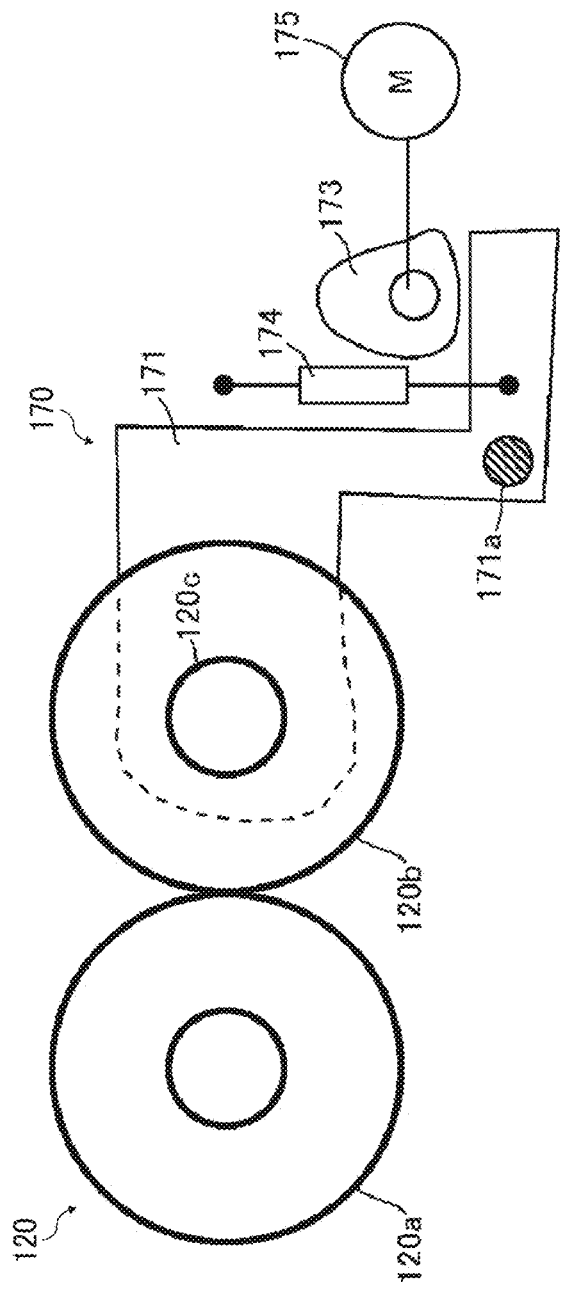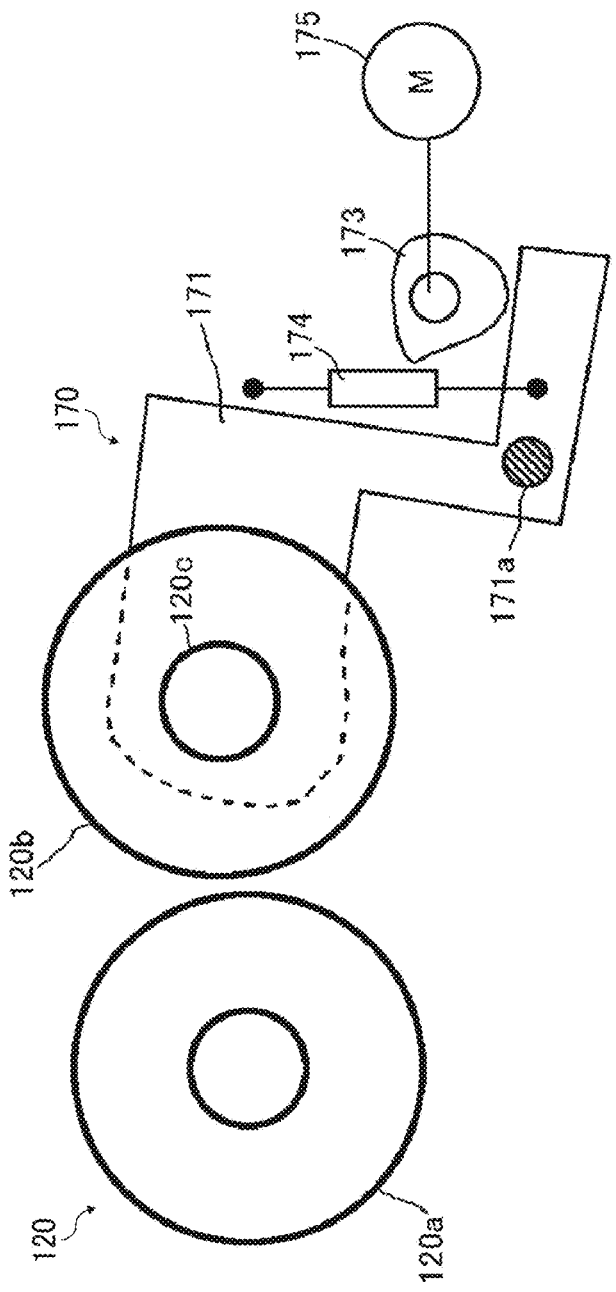

SHEET LAMINATOR AND IMAGE FORMING SYSTEM INCORPORATING THE SHEET LAMINATOR

CROSS-REFERENCE TO RELATED APPLICATIONS

This patent application is based on and claims priority pursuant to 35 U.S.C. § 119(a) to Japanese Patent Application Nos. 2022-095011, filed on Jun. 13, 2022, and 2023-061817, filed on Apr. 6, 2023, in the Japan Patent Office, the entire disclosure of each of which is hereby incorporated by reference herein.

BACKGROUND

Technical Field

Embodiments of the present disclosure relate to a sheet laminator and an image forming system incorporating the sheet laminator.

Background Art

Various types of jam processing apparatuses in the art are known that, when a paper jam occurs with an object to be conveyed being nipped between a registration roller pair and a fixing roller pair, the registration roller pair is rotated in the forward direction and the fixing roller pair is rotated in the reverse direction, so that the object is conveyed out of a regular sheet conveyance passage and is bent to convey to a jammed sheet ejection passage.

However, such jam processing apparatuses in the art include a guide plate disposed between the registration roller pair and the fixing roller pair and need to further include another guide plate or a conveyance roller to convey the jammed object out of the regular sheet conveyance passage and nips the bend of the object to convey the jammed object to a jammed sheet ejection unit. Due to such a configuration, the number of parts increases, and this increase in the number of parts makes the configuration of the apparatus more complex and hinders a size reduction of the apparatus.

A typical jam processing apparatus has a passage separated to the outside of the sheet conveyance passage from an intermediate area between the registration roller pair and the fixing roller pair. When a paper jam occurs, the registration roller pair is rotated in the conveyance direction and the fixing roller pair is rotated in the reverse direction to guide the jammed sheet to the jammed sheet ejection passage while a bend is being formed on the jammed sheet, so that the jammed sheet is conveyed to the jammed sheet ejection unit with a sheet ejection roller pair that conveys the jammed sheet while nipping the bend of the jammed sheet. By so doing, the jammed sheet nipped by the registration roller pair and the fixing roller fixing roller pair can be removed automatically from the sheet conveyance passage.

However, since a paper discharge guide and a pair of paper discharge rollers for removing the jammed paper are provided, the size of the apparatus cannot be reduced, and the demand for space saving cannot be satisfied.

SUMMARY

Embodiments of the present disclosure described herein provide a novel sheet laminator including a fuser pressure member, a conveyor, and a guide. The fuser pressure member thermally fixes a two-ply sheet and a sheet medium inserted between two sheets of the two-ply sheet. The conveyor conveys the two-ply sheet toward the fuser pressure member in a sheet conveyance direction. The guide guides the two-ply sheet in a sheet conveyance passage between the conveyor and the fuser pressure member. At least one of the fuser pressure member or the conveyor is operable to guide the two-ply sheet outside the sheet conveyance passage in response to an occurrence of an abnormal stop of the sheet laminator.

Further, embodiments of the present disclosure described herein provide an image forming system including the above-described sheet laminator and an image forming apparatus to form an image on a sheet medium to be fed to the sheet laminator.

BRIEF DESCRIPTION OF THE SEVERAL VIEWS OF THE DRAWINGS

Exemplary embodiments of this disclosure will be described in detail based on the following figures, wherein:

FIG. 1 is a diagram illustrating an overall configuration of a sheet laminator according to an embodiment of the present disclosure;

FIG. 2 is an enlarged view of a part of from a thermal pressure roller pair to a sheet ejection tray, according to an embodiment of the present disclosure;

FIG. 3 is an enlarged view of a part of from a thermal pressure roller pair to a sheet ejection tray, according to another embodiment of the present disclosure;

FIG. 9A is a schematic diagram illustrating a phase of a flow from occurrence of sheet jam to completion of sheet jam handling;

FIG. 9B is a schematic diagram illustrating a subsequent phase of the flow from occurrence of sheet jam to completion of sheet jam handling;

FIG. 9C is a schematic diagram illustrating another subsequent phase of the flow from occurrence of sheet jam to completion of sheet jam handling:

FIG. 9D is a schematic diagram illustrating yet another subsequent phase of the flow from occurrence of sheet jam to completion of sheet jam handling:

FIG. 9E is a schematic diagram illustrating yet another subsequent phase of the flow from occurrence of sheet jam to completion of sheet jam handling;

FIGS. 10A and 10B are diagrams each illustrating the position of a registration roller pair and an operation knob;

FIGS. 12A and 12B are diagrams each illustrating a moving mechanism that contacts the rollers of the thermal pressure roller pair with each other and separates the rollers from each other.

Figure 4:
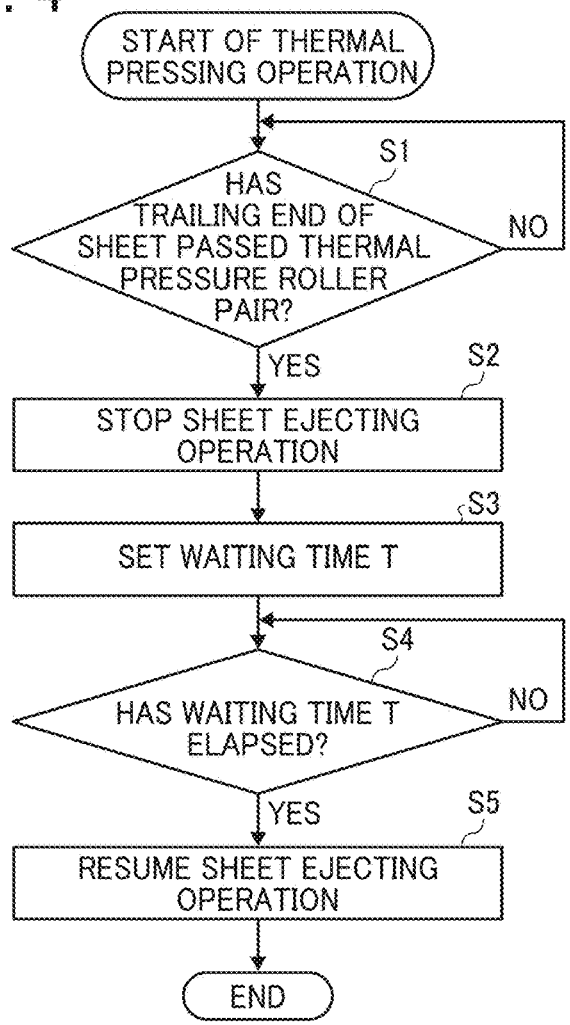
FIG. 4 is a flowchart of a sheet ejecting operation of a sheet laminator, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

A description is given of a sheet processing device according to an embodiment of the present disclosure, with reference to FIG. 1.

FIG. 1 is a schematic diagram illustrating an overall configuration of a sheet laminator according to an embodiment of the present disclosure.

A sheet laminator 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, a two-ply sheet has two sheets (two sides). A first side of the two-ply sheet serves as a transparent sheet such as a transparent polyester sheet, a second side of the two-ply sheet serves as a transparent or opaque sheet is disposed facing the first side, and the first and second sides are bonded at one side of the two-ply sheet. The two-ply sheet also includes a lamination film.

The inner sheet P is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 1, the sheet laminator 100 includes a sheet tray 102 serving as a first stacker that stacks lamination sheets S, a pickup roller 105 that feeds the lamination sheets S from the sheet tray 102, and first conveyance roller pair 107. In the sheet tray 102 of the sheet laminator 100, a plurality of sensors C11 is disposed to detect the size of the lamination sheet S.

A lamination sheet S into which an inner sheet has been inserted is ejected and stacked on a sheet ejection tray 104 by the third conveyance roller pair 113 or, for example, a pair of rollers disposed downstream from the third conveyance roller pair 113 in a sheet conveyance direction. The sheet ejection tray 104 is disposed inside a housing of the sheet laminator 100. Such a configuration facilitates a vertical conveyance of the lamination sheet S toward the sheet ejection tray 104.

A conveyance sensor C1 is disposed downstream from the first conveyance roller pair 107 in the sheet conveyance direction to detect the sheet conveyance position of the lamination sheet S.

A conveyance sensor C2 is disposed downstream from an entrance roller pair 146 and upstream from an exit roller pair 147 in the sheet conveyance direction to detect the sheet conveyance position of the inner sheet P.

The sheet laminator 100 further includes, for example, a second conveyance roller pair 108, a winding roller 109 serving as a rotary member, a third conveyance roller pair 113, a registration roller pair 144 serving as a first conveyor, a fourth conveyance roller pair 145, an ejection roller pair 121, and the sheet ejection tray 104 downstream from the first conveyance roller pair 107 in the sheet conveyance direction. The sheet laminator 10X) further includes separation members 116 between the winding roller 109 and the third conveyance roller pair 113. The separation members 116 are movable in the width direction of the two-ply sheet S. Each of the separation members 116 serves as a separator that separates the lamination sheet S according to the present embodiment.

A conveyance sensor C3 is disposed downstream from the second conveyance roller pair 108 in the sheet conveyance direction to detect the conveyance position of the lamination sheet S and the conveyance position of the inner sheet P.

An abnormal condition detection sensor C4 is disposed downstream from the winding roller 109 in the sheet conveyance direction to detect the condition of the lamination sheet S.

A conveyance sensor C5 that detects the conveyance position of the lamination sheet S is disposed downstream from the third conveyance roller pair 113 in the sheet conveyance direction.

The pickup roller 105, the first conveyance roller pair 107, the second conveyance roller pair 108, and the winding roller 109 are some examples of a first feeder.

In FIG. 1, each set of the second conveyance roller pair 108 and the third conveyance roller pair 113 is, for example, a pair of two rollers and is rotationally driven by a drive device (e.g., a motor). The second conveyance roller pair 108 rotates in one direction. The third conveyance roller pair 113 rotates in forward and reverse directions, thereby nipping and conveying the lamination sheet S and the inner sheet P.

The second conveyance roller pair 108 conveys the lamination sheet S and the inner sheet P vertically downward toward the third conveyance roller pair 113.

On the other hand, the third conveyance roller pair 113 can switch the direction of rotation between the forward direction and the reverse direction that is a direction opposite to the forward direction. The third conveyance roller pair 113 can nip and convey the lamination sheet S vertically downward toward the sheet ejection tray 104 and also convey the lamination sheet S vertically upward toward the winding roller 109 in the reverse direction, that is, a direction to pull back the lamination sheet S.

The sheet laminator 100 is provided with the winding roller 109 as a rotary member and the separation members 116 that are disposed between the second conveyance roller pair 108 and the third conveyance roller pair 113. The winding roller 109 is driven by a drive unit such as a motor to rotate in the forward and reverse directions. The direction of rotation of the winding roller 109 can be switched between the forward conveyance direction (clockwise direction) and the reverse conveyance direction (counterclockwise direction).

The winding roller 10) includes a roller 111 and a sheet gripper 110 movably disposed on the roller 111 to grip the sheet S. The sheet gripper 110 that is movable grips the leading end of the two-ply sheet S between the sheet gripper 110 and the roller 111. The sheet gripper 110 may be formed on the outer circumference of the roller 111 as a single unit or may be formed as a separate unit.

A description is now given of a series of operations performed in the sheet laminator 100, with reference to FIG. 1. The series of operations performed by the sheet laminator 100 indicates the operations from separating the lamination sheet S to inserting the inner sheet P into the lamination sheet S.

In FIG. 1, multiple lamination sheets S are stacked on the sheet tray 102 such that a bonded end of each of the multiple lamination sheets S is located downstream from the pickup roller 105 in the sheet feed direction (sheet conveyance direction). The sheet laminator 100 picks the lamination sheet S on the sheet tray 102 by the pickup roller 105 and conveys the lamination sheet S toward the first conveyance roller pair 107.

The lamination sheet S is then conveyed toward the winding roller 109 by the second conveyance roller pair 108 disposed downstream from the first conveyance roller pair 107 in the sheet conveyance direction. In the sheet laminator 100, the second conveyance roller pair 108 conveys the lamination sheet S with the bonded end, which is one of four sides of the lamination sheet S, as a downstream end in the vertical direction (i.e., a vertically downward direction).

Subsequently, when the trailing end of the lamination sheet S in the vertical direction (i.e., the vertically downward direction) passes by the winding roller 109, the sheet laminator 100 temporarily stops the conveyance.

The sheet laminator 100 then opens the sheet gripper 110, reverses the rotation direction of the third conveyance roller pair 113, and conveys the lamination sheet S vertically upward toward the opening of the sheet gripper 110.

Subsequently, the sheet laminator 100 stops rotation of the third conveyance roller pair 113 to stop conveyance of the lamination sheet S when the trailing end of the lamination sheet S is inserted into the opened portion of the sheet gripper 110, and closes the sheet gripper 110 to grip the trailing end of the lamination sheet S. These operations are performed when the lamination sheet S is conveyed by the designated amount.

The sheet laminator 100 then rotates the winding roller 109 in the clockwise direction to wind the lamination sheet S around the winding roller 109. The lamination sheet S is wound around the winding roller 109 from the side where the two sheets of the lamination sheet S are overlapped but not bonded.

When the lamination sheet S that is the two-ply sheet is wound around the winding roller 109, a winding circumferential length difference (in other words, a winding circumferential amount difference of each of the two sheets of the two-ply sheet) is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets of the lamination sheet S. As the separation members 116 are inserted into the space generated as described above, from both sides of the two-ply sheet S, the space between the two sheets is reliably maintained. In response to the detection of the leading end of the lamination sheet S with the sheet conveyance sensor C5, the lamination sheet S is conveyed from the sheet conveyance sensor C5 by a designated amount to perform these operations.

The sheet laminator 100 rotates the winding roller 109 counterclockwise in a state where the separation members 116 are inserted into the space generated in the lamination sheet S, and moves the space where the lamination sheet S is separated to the trailing end of the lamination sheet S in the vertical direction (i.e., the vertically downward direction in FIG. 1). After the winding roller 109 has been rotated by a designated amount, the sheet laminator 100 causes the sheet gripper 110 to open. As a result, the lamination sheet S is separated into the upper and lower sheets at the trailing end.

When the trailing end of the two-ply sheet S is separated into the upper and lower sheets, the sheet laminator 100 temporarily stops the conveyance of the lamination sheet S and further moves the separation members 116 in the width direction of the lamination sheet S to separate the whole area of the trailing end of the lamination sheet S. In response to the detection of the leading end of the lamination sheet S with the sheet conveyance sensor C5, the lamination sheet S is conveyed from the sheet conveyance sensor C5 by a designated amount to perform these operations.

Subsequently, the sheet laminator 100 rotates the third conveyance roller pair 113 counterclockwise to convey the lamination sheet S in the reverse conveyance direction (i.e., vertically upward in FIG. 1). A branching member 118 can be switched at the time when the leading end of the lamination sheet S passes through the conveyance sensor C5. When the lamination sheet S is conveyed to a non-thermal pressure conveyance passage, the branching member 118 remains at the position illustrated in FIG. 8. However, when the lamination sheet S is conveyed to a thermal pressure conveyance passage 128 toward the thermal pressure roller pair 120, the branching member 118 is switched in the direction toward the thermal pressure conveyance passage 128.

The separation members 116 guide the two sheets separated from the lamination sheet S in the right and left directions in FIG. 1, and thus the two sheets are fully separated from each other. Then, the sheet laminator 100 temporarily stops the conveyance of the lamination sheet S and brings the joined portion of the lamination sheet S into a state of being gripped (nipped) by the third conveyance roller pair 113. Accordingly, one end of the lamination sheet S is bonded as the bonded side of the lamination sheet S and the other end of the lamination sheet S is opened largely.

In response to the detection of the leading end of the lamination sheet S with the sheet conveyance sensor C5, the lamination sheet S is conveyed from the sheet conveyance sensor C5 by a designated amount to perform these operations.

The sheet laminator 100 then rotates the second conveyance roller pair 108 to convey the inner sheet P conveyed from the image forming apparatus side vertically downward toward the third conveyance roller pair 113. The image forming apparatus will be described below with reference to FIG. 6.

Subsequently, the sheet laminator 100 rotates the third conveyance roller pair 113 to merge the lamination sheet S and the inner sheet P, and inserts the inner sheet P into the opened lamination sheet S.

The operation from separation (peeling) of the lamination sheet S to insertion of the inner sheet P has been described above. As illustrated with reference letters SR in FIG. 7, the two sheets of the lamination sheet S are separated and conveyed separately in left and right directions respectively.

The sheet laminator 100 then causes the third conveyance roller pair 113 to convey the lamination sheet S, in which the inner sheet P has been inserted, downward in the vertical direction. Thus, the two sheets of the lamination sheet S overlap again and the opening of the lamination sheets S is closed. The lamination sheet S in which the inner sheet P has been sandwiched is conveyed to a fixing device having a thermal pressure roller pair 120 serving as a fuser pressure member by the third conveyance roller pair 113 or, for example, a pair of rollers disposed downstream from the third conveyance roller pair 113 in the sheet conveyance direction of the lamination sheet S.

When passing through the thermal pressure roller pair 120, the lamination sheet S is thermally pressed and fixed. After passing through the thermal pressure roller pair 120, the lamination sheet S continues to be conveyed vertically downward toward the sheet ejection tray 104 and is stacked on the sheet ejection tray 104. Since the lamination sheet S pressed after passing through the thermal pressure roller pair 120 is ejected vertically downward in this manner, the lamination sheet S can be stacked on the sheet ejection tray 104 while preventing the heated lamination sheet S from being bent by an external force.

More specifically, in the vertical conveyance according to the present embodiment, the lamination sheet S is ejected vertically downward. Accordingly, the gravity applied to the lamination sheet S is parallel to the tangent line of a fixing nip between the rollers of the thermal pressure roller pair 120, and an external force that may deform the lamination sheet S is not applied to the lamination sheet S. Thus, as long as the lamination sheet S continues to be ejected vertically, deformation of the lamination sheet S is reduced. The sheet ejection tray 104 is disposed after the trailing end of the lamination sheet S passes through the thermal pressure roller pair 120 and the ejection roller pair 121, and the lamination sheet S is cooled before reaching the sheet ejection tray 104. Accordingly, the inclination of the stacking surface of the sheet ejection tray 104 does not apply an external force that may deform the lamination sheet S to the lamination sheet S.

As the lamination sheet S is conveyed vertically downward, the lamination sheet S continues to be conveyed vertically downward until the leading end of the lamination sheet S reaches the thermal pressure roller pair 120 and the trailing end of the lamination sheet S completely passes through the thermal pressure roller pair 120. Accordingly, the vertical conveyance of the lamination sheet S is given, thus preventing the bending of the thermally-pressed lamination sheet S due to the external force.

The sheet laminator 100 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user, and therefore the sheet laminator 100 can enhance and provide the convenience better than a known sheet laminator employing a known technique. Since the sheet laminator 100 includes the fixing device including the thermal pressure roller pair 120 and can perform a sheet laminating operation, the sheet laminator 100 may be referred to as a lamination processing apparatus in a narrow sense. Accordingly, such a lamination processing apparatus is appropriately described as the sheet laminator 100 below.

FIG. 2 is an enlarged view of a part of from the thermal pressure roller pair 120 to the sheet ejection tray 104, according to an embodiment of the present disclosure.

In this example, multiple lamination sheets (laminated sheets SG) are stacked on the sheet ejection tray 104. As illustrated in FIG. 2, a distance L from the fixing nip region of the thermal pressure roller pair 120 to the stacking surface of the sheet ejection tray 104 or the uppermost surface of the laminated sheets SG stacked on the sheet ejection tray 104 on an extension line of a sheet conveyance passage is longer than the length of the lamination sheet S in the sheet conveyance direction. Accordingly, the leading end of the lamination sheet S does not contact the stacking surface of the sheet ejection tray 104 or the stacked laminated sheets SG until the trailing end of the lamination sheet S completely passes through the thermal pressure roller pair 120, thus preventing the heated lamination sheet S from being bent by an external force.

The sheet ejection tray 104 can stack lamination sheets S up to a thickness of, for example, 50 mm. In order to detect the full state of the stacked laminated sheets SG, an optical sensor 160 (e.g., a laser displacement meter) that detects the uppermost surface of the stacked laminated sheets SG is provided with the sheet ejection tray 104. In this case, the distance L is longer than the length of the lamination sheet S in the sheet conveyance direction at least up to the thickness of 50 mm of laminated sheets SG.

FIG. 3 is an enlarged view of a part of from the thermal pressure roller pair 120 to the sheet ejection tray 104, according to another embodiment of the present disclosure.

In this example, more sheets (laminated sheets SG) than in the example illustrated in FIG. 2 are stacked on the sheet ejection tray 104. As illustrated in FIG. 3, when the leading end of the lamination sheet S during sheet ejection from the ejection roller pair 121 contacts the uppermost surface of the laminated sheets SG after fixing in the sheet ejection tray 104, the lamination sheet S is bent.

The sheet laminator 100 has a configuration in which a distance D between a contact point of the leading end of the lamination sheet S during sheet ejection and the uppermost surface of the laminated sheets SG and a vertical line passing through the nip region of the ejection roller pair 121 is equal to or less than 30 mm. For example, an optical sensor 160 (for example, a laser-displacement meter) is disposed at a position from the sheet ejection tray 104 such that the optical sensor 160 detects the distance to the uppermost sheet of the stacked lamination sheets S that is at a position where the distance D is 30 mm. Such a configuration can determine whether the length D is equal to or less than 30 mm.

Setting the distance D to be equal to or less than 30 mm can reduce the bending of the lamination sheet S and enhance the stacking performance, even if the leading end of the lamination sheet S contacts the uppermost surface of the laminated sheets SG during sheet ejection of the lamination sheet S. When the optical sensor 160 detects that the distance D exceeds 30 mm, the sheet laminator 100 determines that the sheet ejection tray 104 is full, and stops fixing and conveying the lamination sheet S. Preventing the distance D from exceeding 30 mm in this manner can prevent the lamination sheet S from being largely bent when the leading end of the lamination sheet S contacts the uppermost surface of the laminated sheets SG during sheet ejection of the lamination sheet S. Note that the numerical value "30 mm" is merely an example, and is a numerical value determined by evaluating in advance the thickness of the lamination sheet S and the inner sheet P to be used depending on the specifications of the sheet laminator.

As illustrated in FIGS. 1 to 3, the ejection roller pair 121 that ejects the lamination sheet S toward the sheet ejection tray 104 are disposed downstream from the thermal pressure roller pair 120 in the sheet conveyance direction. Ejecting the lamination sheet S by the ejection roller pair 121 can reduce the formation of wrinkles on the lamination sheet S after thermal pressing. Ejecting the lamination sheet S in the vertical direction by the ejection roller pair 121 can reduce bending of the lamination sheet S after the thermal pressing.

FIG. 4 is a flowchart of a sheet ejecting operation of the sheet laminator 100, according to an embodiment of the present disclosure.

After the start of a thermal pressing operation in the fixing device that includes the thermal pressure roller pair 120, the sheet laminator 100 determines whether the trailing end of the lamination sheet S has passed through the thermal pressure roller pair 120, in step S1. For this determination, the sheet laminator 100 includes a detector (sensor) that detects the lamination sheet S, and the detector is, for example, a conveyance sensor C12 (see FIG. 3) disposed downstream from the thermal pressure roller pair 120 in the sheet conveyance direction of the lamination sheet S.

When the trailing end of the lamination sheet S completely passes through the thermal pressure roller pair 120 (YES in step S1), the sheet laminator 100 stops the sheet ejecting operation of the lamination sheet S in step S2, and holds the lamination sheet S by the ejection roller pair 121. Then, a timer in the sheet laminator 100 sets a waiting time T based on the size of the lamination sheet S detected by the sensors C11, in step S3, and a controller 90 determines whether the waiting time T has elapsed, in step S4. When the waiting time T has not elapsed (NO in step S4), step S4 is repeated until the waiting time T elapses. When the waiting time T has elapsed (YES in step S4), the sheet laminator 100 resumes the sheet ejecting operation of the lamination sheet S in step S5, and ejects the lamination sheet S.

As described above, the sheet laminator 100 stops the ejection roller pair 121, holds the lamination sheet S by the ejection roller pair 121, and resumes the sheet ejecting operation after waiting for the waiting time T (required time) to elapse. Accordingly, the lamination sheet S is ejected after waiting for a decrease of the temperature of the thermally-pressed lamination sheet S, thus reducing the bending of the lamination sheet S.

Figure 5:
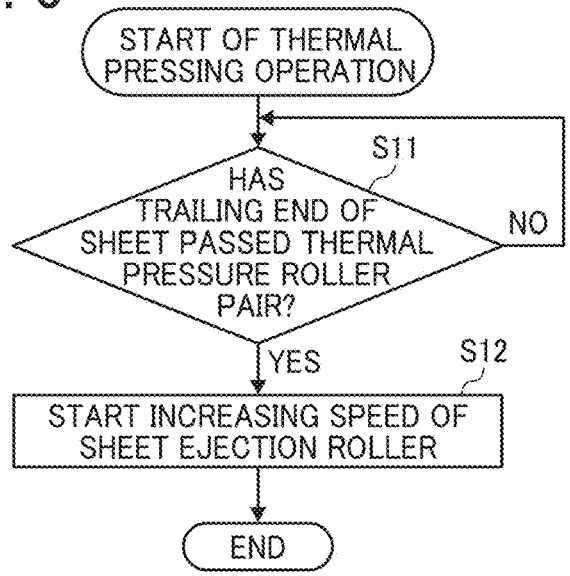
FIG. 5 is a flowchart of a sheet ejecting operation of a sheet laminator, according to another embodiment of the present disclosure.

FIG. 5 is a flowchart of a sheet ejecting operation of the sheet laminator 100, according to another embodiment of the present disclosure.

After the start of a thermal pressing operation in the fixing device that includes the thermal pressure roller pair 120, the sheet laminator 100 determines whether the trailing end of the lamination sheet S has passed through the thermal pressure roller pair 120, in step S11. For this determination, the sheet laminator 100 includes a detector (sensor) that detects the lamination sheet S, and the detector is, for example, a conveyance sensor C12 (see FIG. 3) disposed downstream from the thermal pressure roller pair 120 in the sheet conveyance direction of the lamination sheet S.

When the trailing end of the lamination sheet S has not completely passed through the thermal pressure roller pair 120 (NO in step S11), step S11 is repeated until the trailing end of the lamination sheet S completely passes through the thermal pressure roller pair 120. When the trailing end of the lamination sheet S has completely passed through the thermal pressure roller pair 120 (YES in step S11), the sheet laminator 100 increases the rotation speed of the ejection roller pair 121 to start increasing the conveyance speed of the ejection roller pair 121 to convey the lamination sheet S, in step S12. Accordingly, the time during which the leading end of the thermally-pressed lamination sheet S contacts the stacking surface of the sheet ejection tray 104 or the uppermost surface of the stacked sheets SG is shortened, and thus the bending of the lamination sheet S can be reduced.

Figure 6:
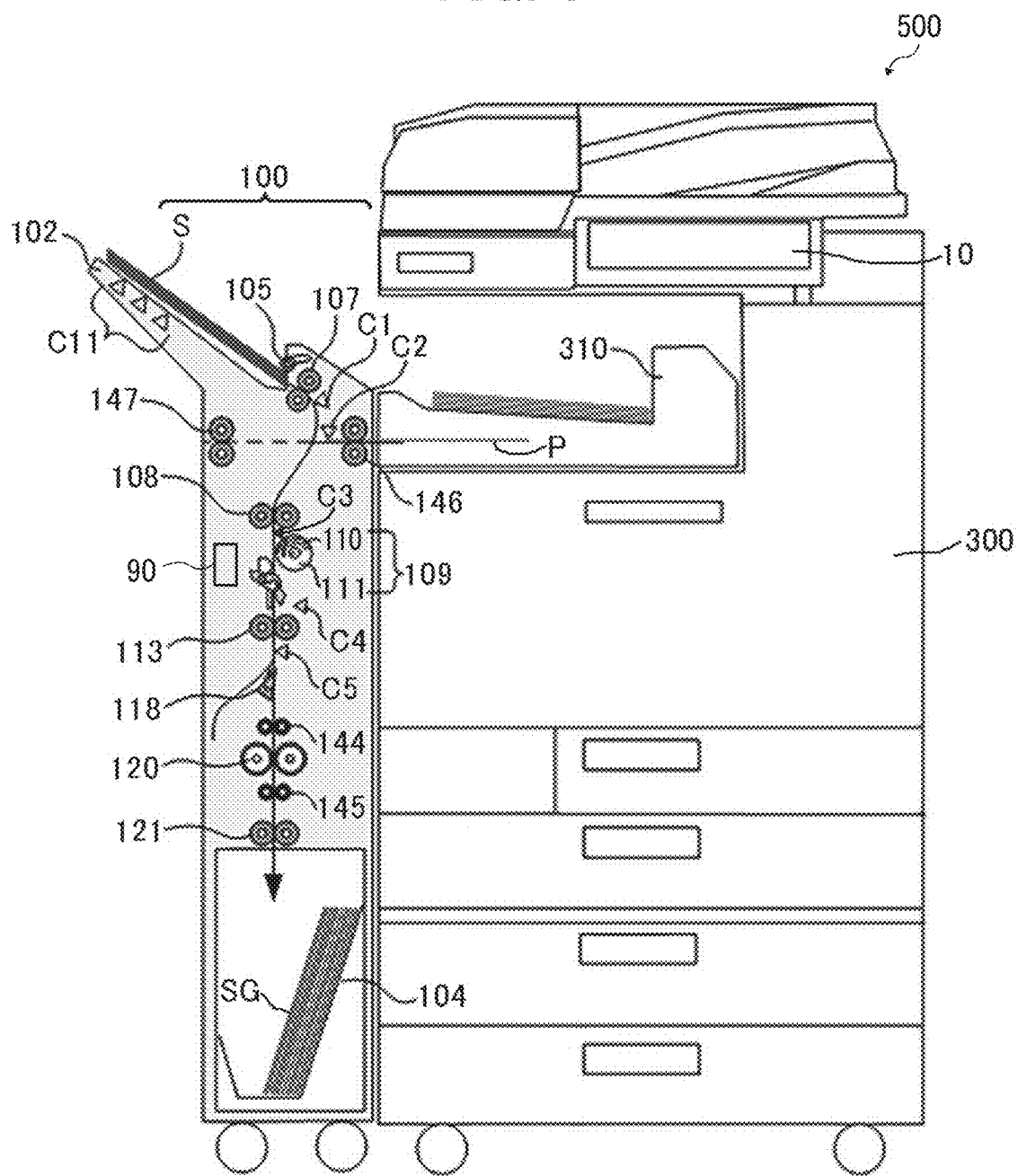
FIG. 6 is a diagram illustrating an overall configuration of an image forming apparatus including a sheet laminator according to an embodiment of the present disclosure.

FIG. 6 is a diagram illustrating an overall configuration of an image forming system including an image forming apparatus and the sheet laminator according to an embodiment of the present disclosure.

An image forming system 500 includes an image forming apparatus 300 that forms an image on, for example, an inner sheet P, and the sheet laminator 100 as an external sheet processing apparatus. The sheet laminator 100 includes a sheet tray 102 on which lamination sheets S are stacked, and receives inner sheets P fed from the image forming apparatus 300 to the sheet laminator 100 via a relay device 310. Accordingly, the image forming apparatus 300 (e.g., a printer or a copier) can insert an inner sheet P on which an image is formed into the lamination sheet S in an in-line system. Thus, the image forming system 500 can perform a series of operations of, in this order, the feeding of the lamination sheet S, the separation of the lamination sheet S, the insertion of the inner sheet P into the lamination sheet S, and the sheet laminating operation by application of heat and pressure without using manpower.

An operation panel 10 is disposed in an exterior portion of the image forming apparatus 300. The operation panel 10 serves as a display operation device to display information in the image forming apparatus 30) and receives an operation input by a user. In addition, the operation panel 10 also serves as a notification device that issues a perceptual signal to the user. Alternatively, a notification device other than the operation panel 10 may be separately disposed in the image forming apparatus 300.

Figure 7:
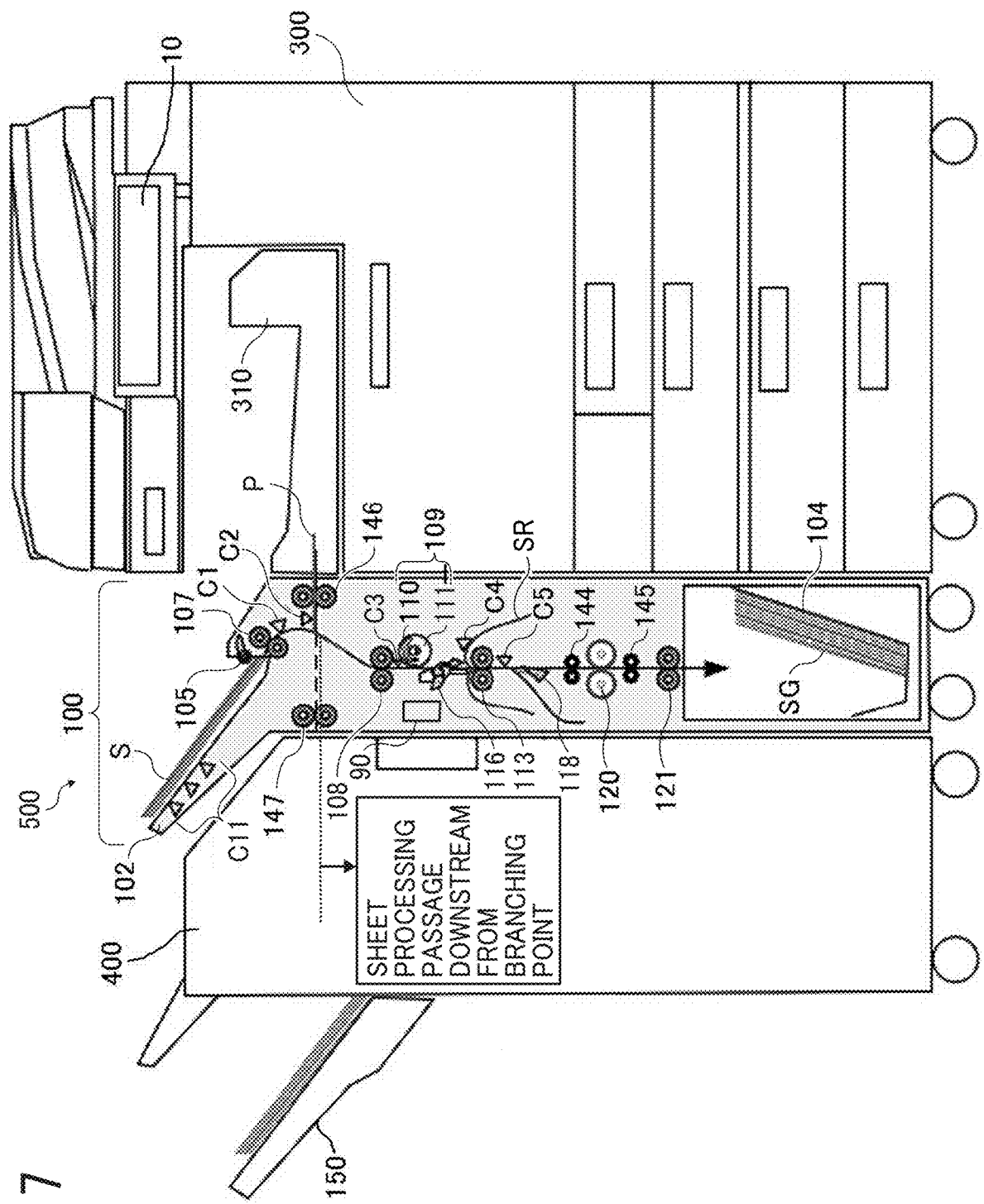
FIG. 7 is a diagram illustrating an overall configuration of an image forming system including a sheet laminator according to an embodiment of the present disclosure.

FIG. 7 is a diagram illustrating another overall configuration of an image forming system including a sheet laminator according to another embodiment of the present disclosure, and an image forming apparatus.

The image forming system 500 includes the image forming apparatus 300, the relay device 310, the sheet laminator 100, and a post-processing apparatus 400.

The image forming system 500 according to the present embodiment feeds an inner sheet P on which an image is formed by the image forming apparatus 300 from the sheet laminator 100 via the relay device 310. The post-processing apparatus 400 serving as a post-processing apparatus other than the sheet laminator 100 is disposed downstream from the sheet laminator 100 in the sheet conveyance direction. As described above, the post-processing apparatus 400 that serves as a post-processing apparatus other than the sheet laminator 100 is disposed downstream from the sheet laminator 100 in the sheet conveyance direction. By so doing, when a print job that does not require the sheet laminating operation and requires another post-processing operation (e.g., the binding operation or the sheet folding operation) is executed, the image forming system 500 causes a sheet (i.e., the inner sheet P) conveyed from the image forming apparatus 300 to be simply passed through the sheet laminator 100 to convey to the post-processing apparatus 400. Accordingly, the post-processing apparatus 400 can perform the post-processing operation on the sheet (i.e., the inner sheet P). As a result, the image forming system 500 can be used according to the needs of the user without reducing the efficiency.

As the image forming system 500 illustrated in FIG. 7, the post-processing apparatus 400 is provided to perform the post-processing operations including the punching operation and the stapling operation, on the lamination sheet S ejected from the image forming apparatus 300 through the sheet laminator 100 (in other words, on the lamination sheet S without the sheet laminating operation). In such a case, the lamination sheet S is ejected to an ejection tray 150 of the post-processing apparatus 400 after the post-processing operation has been performed on the lamination sheet S.

A detailed description is now given of the sheet laminator 100 according to an embodiment of the present disclosure.

Figure 8:
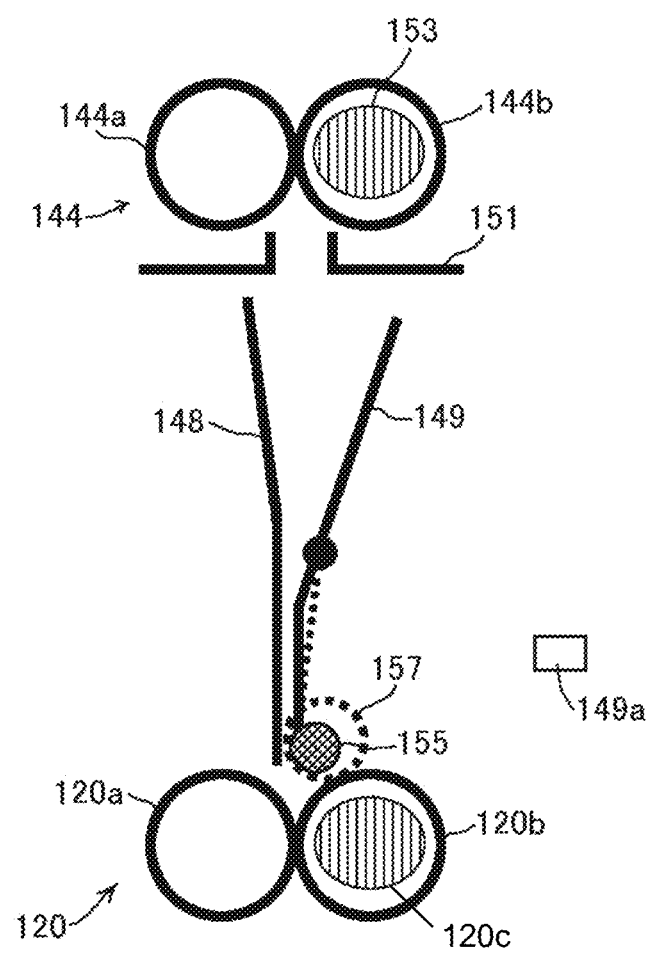
FIG. 8 is a diagram illustrating a part of a sheet laminator according to an embodiment of the present disclosure.

FIG. 8 is a diagram illustrating a part of the sheet laminator according to an embodiment of the present disclosure.

The sheet laminator 100 performs a sheet laminating operation on the lamination sheet S and the inner sheet P that is a sheet medium inserted between two sheets of the lamination sheet S. The sheet laminator 100 further includes registration roller pair 144, a registration guide pair exit guide 151, a thermal pressure roller pair 120, a first guide 148, and a second guide 149. The registration roller pair 144 serves as a first conveyor to send the lamination sheet S from upstream in the sheet conveyance direction toward the thermal pressure roller pair 120. The thermal pressure roller pair 120 serves as a fuser pressure member that heats and presses the lamination sheet S. The first guide 148 is disposed between the registration roller pair 144 and the thermal pressure roller pair 120 to guide the lamination sheet S. The second guide 149 is disposed facing the first guide 148. The sheet laminator 100 further includes an operation knob 153 that serves as an operating member with which a user manually rotates the registration roller pair 144. When the lamination sheet S is removed at the time of an abnormal stop such as a conveyance jam, the user rotates the operation knob 153 to rotate the registration roller pair 144 to bend the jammed sheet S. By so doing, the lamination sheet S is guided to the outside of the sheet conveyance passage between the registration roller pair 144 and the thermal pressure roller pair 120, so that the lamination sheet S is removed. According to this configuration, there is no need to add a guide plate or a conveyance roller pair for removing the lamination sheet S. As a result, the sheet laminator 100 having a compact, simple configuration is provided. Providing the operation knob 153 for the sheet jam handling allows the user to rotate the operation knob 153 to easily remove the lamination sheet S.

Further, in FIG. 8, the second guide 149 is biased toward the first guide 148 by a torsion spring 157 serving as a biasing member, and is located at a guide position for guiding the lamination sheet S. Further, a guide detection sensor 149a is provided with the second guide 149 to detect that the second guide 149 is at an open position that is described below. The guide detection sensor is, for example, a reflection type optical sensor or a transmission type optical sensor. However, the guide detection sensor is not limited to the above-described components and may be a contact type displacement sensor.

FIGS. 9A, 9B, 9C, 9D, and 9E are schematic diagrams each illustrating a phase of a flow from occurrence of sheet jam to completion of sheet jam handling.

Specifically, FIG. 9A illustrates a state of occurrence of a sheet jam, in other words, a state where the lamination sheet S is jammed while being nipped by the registration roller pair 144 and the thermal pressure roller pair 120.

FIG. 9B is a schematic diagram illustrating a subsequent phase of the flow from occurrence of sheet jam to completion of sheet jam handling.

FIG. 9C is a schematic diagram illustrating another subsequent phase of the flow from occurrence of sheet jam to completion of sheet jam handling.

FIG. 9D is a schematic diagram illustrating yet another subsequent phase of the flow from occurrence of sheet jam to completion of sheet jam handling.

FIG. 9E is a schematic diagram illustrating yet another subsequent phase of the flow from occurrence of sheet jam to completion of sheet jam handling.

When such a jam as illustrated in FIG. 9A occurs, the sheet laminator 100 notifies the user of the occurrence of the sheet jam by an alarm sound or a warning display on the operation panel 10 to prompt the user to perform a sheet jam handling. In FIG. 9B, as the user rotates the operation knob 153 in a direction indicated by an arrow in the drawing, the lamination sheet S nipped by the registration roller pair 144 is pushed toward the thermal pressure roller pair 120, and the lamination sheet S starts to be bent. As the lamination sheet S is bent, the second guide 149 also starts rotating around a rotational support 155 due to the rigidity of the lamination sheet S. and a space between the first guide 148 and the second guide 149 starts to increase.

In FIG. 9C, as the user continues to rotate the operation knob 153, the lamination sheet S further increases the bend. Along with the increase of the bend of the lamination sheet S, the second guide 149 is completely open, in other words, the second guide 149 is at the open position at which the sheet conveyance passage is open. Accordingly, the second guide 149 can move between the guide position and the open position. The second guide 149 is moved from the guide position to the open position by the lamination sheet S along with guidance of the lamination sheet S to the outside of the sheet conveyance passage. When the guide detection sensor 149a detects that the second guide 149 is at the open position, the controller 9X) drives a cam drive motor 175 that is described below to rotate a movable bracket drive cam 173 based on the detection result of the guide detection sensor 149a. As the movable bracket drive cam 173 rotates, a movable bracket 171 that rotatably supports a second thermal pressure roller 120b rotates clockwise around a movable bracket rotational support 171a against the biasing force of a biasing spring 174. As the second thermal pressure roller 120b rotates, as illustrated in FIG. 9D, a first thermal pressure roller 120a and the second thermal pressure roller 120b separate from each other (in other words, the pressure between the first thermal pressure roller 120a and the second thermal pressure roller 120b are decompressed), the lamination sheet S nipped by the thermal pressure roller pair 120 is released. Finally, as illustrated in FIG. 9E, the user pulls out the lamination sheet S to the right side of the sheet laminator 100 to remove the lamination sheet S from the sheet laminator 100, and thus the jam processing is completed. As described above, bending the lamination sheet S presses and expands the guide with the rigidity of the lamination sheet S to the outside of the sheet conveyance passage. By so doing, the removal operation of the jammed lamination sheet S in the sheet conveyance passage can be easily performed with a simple configuration.

As described above, in the sheet laminator 100 according to the present embodiment, as illustrated in FIGS. 9A to 9E, when the lamination sheet S is removed, the user operates the operation knob 153 to form a bend in the lamination sheet S between the registration roller pair 144 and the thermal pressure roller pair 120 and the second guide 149 biased by the torsion spring 157 is expanded due to the rigidity of the lamination sheet S. The sheet laminator 100 according to the present embodiment has the configuration in which the second guide 149 is expanded. However, the configuration of the sheet laminator is not limited to this configuration. For example, instead of this configuration, the second guide 149 may be fixed while the first guide 148 may be biased toward the second guide 149 by the torsion spring 157 and rotatable around the rotational support.

A moving mechanism that contacts and separates the rollers of the thermal pressure roller pair 120 or the rollers of the registration roller pair 144 is described below with reference to FIGS. 12A and 12B.

FIGS. 10A and 10B are diagrams each illustrating the relative positions of the registration roller pair 144 and the operation knob 153.

The present embodiment illustrated in FIG. 10A indicates the configuration of the operation knob 153 according to the embodiment illustrated in FIGS. 8 to 9E. The biasing force of the second guide 149 is generated by the torsion spring 157 illustrated in FIGS. 8 to 9E. The biasing force is set to about 1N to 4N, so that the second guide 149 can be expanded against the biasing force even by the rigidity of the bend of the thinnest passable lamination sheet S and the thickest passable lamination sheet S can be guided to the fixing nip region that is the nip region of two thermal pressure rollers of the thermal pressure roller pair 120.

In the embodiment illustrated in FIG. 10A, the operation knob 153 is provided on a shaft 144c of a second registration roller 144b of the registration roller pair 144 that is being driven. Moreover, the thermal pressure roller pair 120 is a pair of rollers that are separatable from each other. On the other hand, in the embodiment illustrated in FIG. 10B, a first drive transmission gear 159a is disposed on the shaft 144c of the second registration roller 144b, and a second drive transmission gear 159b that meshes with the first drive transmission gear 159a is mounted on a shaft 153a of the operation knob 153. As a result, as a user rotates the operation knob 153, the driving force of the operation knob 153 is transmitted to the shaft 144c of the second registration roller 144b via the first drive transmission gear 159a and the second drive transmission gear 159b to rotate the second registration roller 144b. As described above, the operation knob 153 may indirectly rotate the second registration roller 144b via the first drive transmission gear 159a and the second drive transmission gear 159b.

The operation knob 153 for driving the registration roller pair 144 is described with reference to FIGS. 10A and 10B. However, the configuration is not limited to the above-described configuration. Instead of the registration roller pair 144, the operation knob 153 having the similar configuration to the configuration of the registration roller pair 144 may be provided to the thermal pressure roller pair 120. At this time, the registration roller pair 144 is a pair of rollers that are separatable from each other. In this case, the user rotates the operation knob 153 so that the lamination sheet S is conveyed in a reverse direction to the sheet conveyance direction to form a bend.

Further, the operation knob 153 having the similar configuration to the configuration of the registration roller pair 144 may be provided to both the registration roller pair 144 and the thermal pressure roller pair 120, as shown by operation knob 120c in FIG. 8.

Further, a one-way clutch may be provided between the operation knob 153 and the shaft of one roller of the pair of rollers in order to surely form a bend of the lamination sheet S between the registration roller pair 144 and the thermal pressure roller pair 120 when the user turns the operation knob 153. If the user does not turn the operation knob 153 so that the lamination sheet S is conveyed in the sheet conveyance direction or the reverse direction opposite to the sheet conveyance direction to form a bend, the operation knob 153 may idle by the one-way clutch.

In other words, w % ben the operation knob 153 is provided for the registration roller pair 144, the operation knob 153 can be rotated only in the direction to convey the lamination sheet S toward downstream in the sheet conveyance direction.

On the other hand, when the operation knob 153 is included in the thermal pressure roller pair 120, the operation knob 153 conveys the lamination sheet S toward upstream in the sheet conveyance direction. For this reason, the operation knob 153 provided for the thermal pressure roller pair 120 cannot be turned in the direction in which the lamination sheet S is conveyed toward downstream in the sheet conveyance direction. As a result, this configuration prevents the lamination sheet S from being wound around the thermal pressure roller pair 120.

Figure 11A:
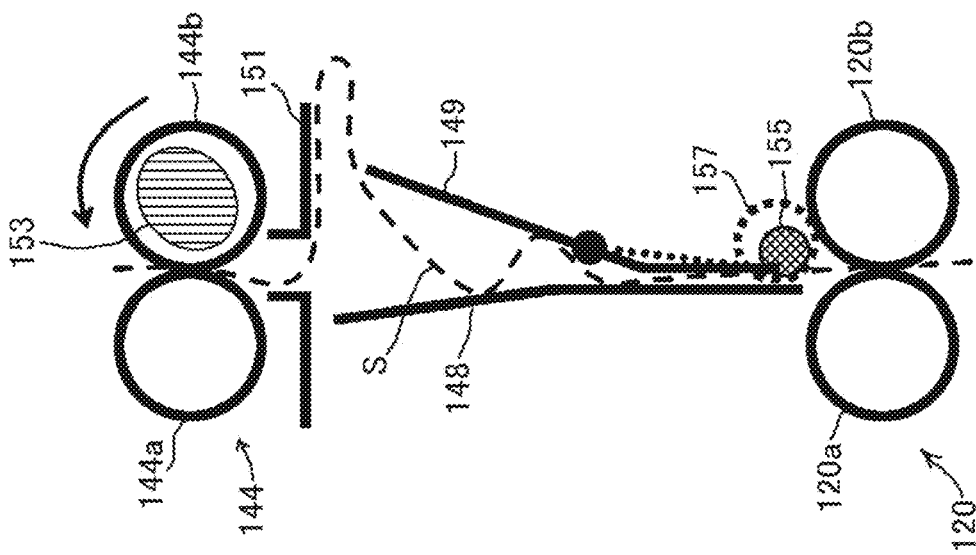
FIG. 11A is a schematic diagram illustrating the flow from occurrence of sheet jam to completion of sheet jam handling in a sheet laminator according to another embodiment of the present disclosure.
Figure 11B:
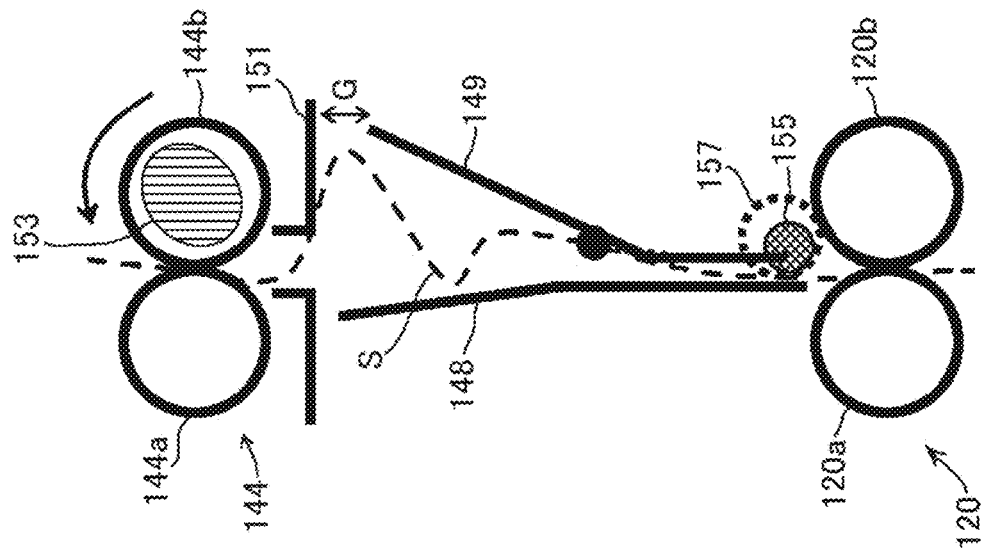
FIG. 11B is a schematic diagram illustrating the flow from occurrence of sheet jam to completion of sheet jam handling in a sheet laminator according to yet another embodiment of the present disclosure.
Figure 11C:
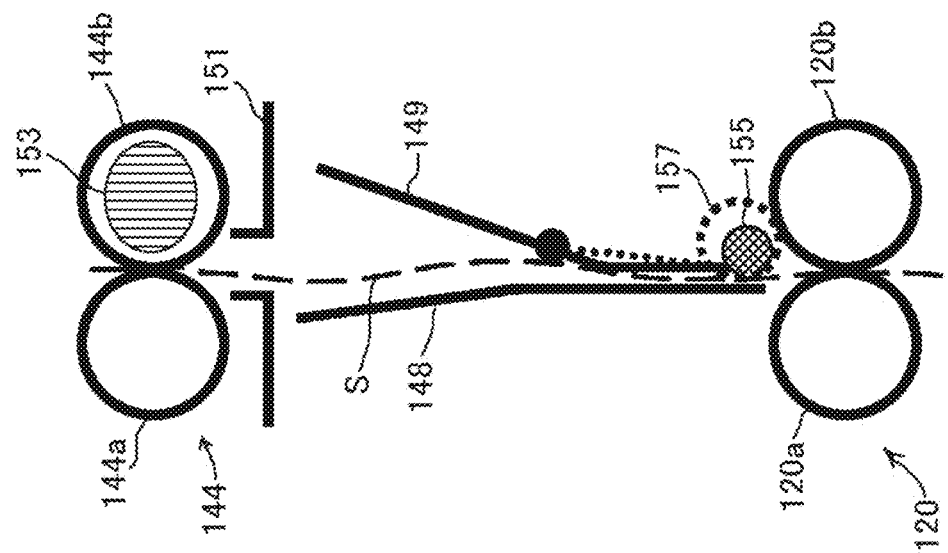
FIG. 11C is a schematic diagram illustrating the flow from occurrence of sheet jam to completion of sheet jam handling in a sheet laminator according to yet another embodiment of the present disclosure.

FIGS. 11A, 11B, and 11C are schematic diagrams each illustrating the flow from occurrence of sheet jam to completion of sheet jam handling in a sheet laminator according to different embodiments of the present disclosure.

The sheet laminator 100 according to the present embodiment has a configuration similar to the configuration of the sheet laminator 100 illustrated in FIG. 8. However, the bend of the lamination sheet S is guided to the gap G of the guide to be taken out to the outside of the sheet conveyance passage, so that the lamination sheet S is removed.

FIG. 11A illustrates occurrence of a sheet jam, in other words, a state where the lamination sheet S is jammed between the registration roller pair 144 and the thermal pressure roller pair 120. The gap G is formed between the registration roller pair 144 and the second guide 149, in particular, between the registration guide pair exit guide 151 and the second guide 149 to guide the lamination sheet S to the outside of the sheet conveyance passage. Alternatively, the gap G may be formed between the registration roller pair 144 and the first guide 148, in particular, between the registration guide pair exit guide 151 and the first guide 148, and the lamination sheet S is guided to the gap G, so that the lamination sheet S can be taken out to the outside of the sheet conveyance passage and be removed.

In FIG. 11B, as the user rotates the operation knob 153 in a direction indicated by an arrow in the drawing, the lamination sheet S nipped by the registration roller pair 144 is pushed toward the thermal pressure roller pair 120. By so doing, the lamination sheet S starts to be bent and the bend of the lamination sheet S extends toward the gap G.

Finally, in FIG. 11C, the bend of the lamination sheet S comes out form the gap G to the outside of the sheet conveyance passage. Then, the user pulls out the lamination sheet S to the right side of the sheet laminator 100 to remove the lamination sheet S from the sheet laminator 100, and thus the jam processing is completed.

In the present embodiment, the gap G is set to have a length from 7 mm to 9 mm. In addition, as a process in which the lamination sheet S moves to the outside of the sheet conveyance passage, the states after the operation knob 153 is turned may change to FIGS. 11A, 11B, and 11C in this order or to FIGS. 9A, 9B, 9C, and 11C in this order.

In the configuration of the embodiment illustrated in FIGS. 11A, 11B, and 11C, the operation knob 153 is mounted on a shaft 144a of the registration roller pair 144 that is driven (see FIG. 10A). However, in the present embodiment, the operation knob 153 having the configuration similar to the configuration illustrated in FIGS. 11A, 11B, and 11C may be mounted on the thermal pressure roller pair 120 instead of the registration roller pair 144. In this case, the user turns the operation knob 153 so that the lamination sheet S is conveyed in a reverse direction to the sheet conveyance direction to form a bend. Further, the operation knob 153 having the similar configuration to the configuration of the registration roller pair 144 may be provided to both the registration roller pair 144 and the thermal pressure roller pair 120. Further, a one-way clutch may be provided between the operation knob 153 and the shaft of one roller of the pair of rollers in order to surely form a bend of the lamination sheet S between the registration roller pair 144 and the thermal pressure roller pair 120 when the user turns the operation knob 153. In other words, in this case, if the user does not turn the operation knob 153 so that the lamination sheet S is conveyed in the sheet conveyance direction or the reverse direction opposite to the sheet conveyance direction to form a bend, the operation knob 153 may idle by the one-way clutch.

FIGS. 12A and 12B are diagrams each illustrating a moving mechanism 170 that contacts the rollers of the thermal pressure roller pair 120 with each other and separates the rollers from each other.

Specifically, FIG. 12A illustrates a contact state of the thermal pressure roller pair 120, and FIG. 12B illustrates a separation state of the thermal pressure roller pair 120.

The moving mechanism 170 contacts or separates the thermal pressure roller pair 120 and includes a movable bracket 171, a movable bracket drive cam 173, and a biasing spring 174 serving as a biasing member. The thermal pressure roller pair 120 has the first thermal pressure roller 120a (left in the drawings) and the second thermal pressure roller 120b (right in the drawings). The first thermal pressure roller 120a is fixed. The second thermal pressure roller 120b is rotatably supported by a shaft 120c at one end of the movable bracket 171. The movable bracket 171 has a bent shape. The shaft 120c of the second thermal pressure roller 120b of the thermal pressure roller pair 120 is fixed to one end the movable bracket 171. The movable bracket 171 is disposed to be movable around a movable bracket rotational support 171a. Further, the movable bracket 171 is biased by the biasing spring 174 to be rotatable in the counterclockwise direction around the movable bracket rotational support 171a so that the first thermal pressure roller 120a and the second thermal pressure roller 120b of the thermal pressure roller pair 120 contact with each other as illustrated in FIG. 12A. The movable bracket drive cam 173 is rotatable by the cam drive motor 175. As the movable bracket drive cam 173 rotates to the position illustrated in FIG. 12B, the movable bracket 171 to which force is applied by the movable bracket drive cam 173 rotates in the clockwise direction around the movable bracket rotational support 171a against the biasing force of the biasing spring 174. In response to this operation, the second thermal pressure roller 120b that is movable separates from the first thermal pressure roller 120a that is fixed. As a result, the thermal pressure roller pair 120 is brought into the separation state. Accordingly, by separating the first thermal pressure roller 120a and the second thermal pressure roller 120b in contact with each other with a relatively large surface pressure, the pulling force of the lamination sheet S can be reduced.

The moving mechanism 170 illustrated in FIGS. 12A and 12B is mounted on the thermal pressure roller pair 120. However, a moving mechanism 170 having the similar configuration as the moving mechanism 170 on the thermal pressure roller pair 120 may be mounted on the registration roller pair 144. Due to such a configuration, by separating the rollers of the registration roller pair 144 in contact with each other with a relatively large surface pressure, the pulling force of the lamination sheet S can be reduced.

Further, the rollers of the thermal pressure roller pair 120 or the rollers of the registration roller pair 144 may not be separated from each other. For example, one of the rollers of the thermal pressure roller pair 120 or one of the rollers of the registration roller pair 144 may have a reduction of pressure or the pulling force of the lamination sheet S may be reduced due to the reduction of pressure.

As described above, the sheet laminator 100 according to an embodiment of the present disclosure to perform a sheet laminating operation includes the registration roller pair 144 to convey the lamination sheet S from upstream in the sheet conveyance direction toward the thermal pressure roller pair 120, the thermal pressure roller pair 120 to heat and fix the lamination sheet S, and the guide to guide the lamination sheet S between the registration roller pair 144 and the thermal pressure roller pair 120. When removing the lamination sheet S at the time of an abnormal stop such as a conveyance sheet jam, the user rotates the thermal pressure roller pair 120, the registration roller pair 144, or both to form a bend on the lamination sheet S. Then, the lamination sheet S is guided to the outside of the sheet conveyance passage between the registration roller pair 144 and the thermal pressure roller pair 120. By so doing, the user can efficiently remove the jammed lamination sheet S.

Aspects of the present invention are, for example, as follows.

Aspect 1

In Aspect 1, a sheet laminator includes a fuser pressure member, a conveyor, and a guide. The fuser pressure member thermally fixes a two-ply sheet and a sheet medium inserted between two sheets of the two-ply sheet. The conveyor conveys the two-ply sheet toward the fuser pressure member in a sheet conveyance direction. The guide guides the two-ply sheet in a sheet conveyance passage between the conveyor and the fuser pressure member. At least one of the fuser pressure member or the conveyor is operable to guide the two-ply sheet outside the sheet conveyance passage in response to an occurrence of an abnormal stop of the sheet laminator.

Aspect 2

In Aspect 2 of the present disclosure, according to Aspect 1, the sheet laminator further includes an operation part manually rotatable to rotate at least one of the fuser pressure member or the conveyor to guide the two-ply sheet outside the sheet conveyance passage in response to the occurrence of the abnormal stop of the sheet laminator.

Aspect 3

In Aspect 3 of the present disclosure, according to Aspect 1 or 2, the guide includes a first guide and a second guide facing the first guide. One of the first guide or the second guide is movable between a guiding position at which the two-ply sheet is guided in the sheet conveyance passage in the sheet conveyance direction and an opening position at which the two-ply sheet is guided outside the sheet conveyance passage. The two-ply sheet moving outside the sheet conveyance passage moves the one of the first guide or the second guide from the guiding position to the opening position.

Aspect 4

In Aspect 4, in the sheet laminator according to any one of Aspects 1 to 3, the guide includes a first guide, a second guide facing the first guide, and a gap between the conveyor and an upstream end of one of the first guide or the second guide, the gap guiding the two-ply sheet outside the sheet conveyance passage.

Aspect 5

In Aspect 5, in the sheet laminator according to Aspect 2, the conveyor includes the operation part, and the fuser pressure member includes a pair of rollers separatable from each other.

Aspect 6

In Aspect 6, in the sheet laminator according to Aspect 2, the fuser pressure member includes the operation part, and the conveyor includes a pair of rollers separatable from each other.

Aspect 7

In Aspect 7, in the sheet laminator according to Aspect 5, the operation part includes a one-way clutch and is rotatable only in one direction to convey the two-ply sheet in the sheet conveyance direction.

Aspect 8

In Aspect 8, the sheet laminator according to Aspect 6, the operation part in the fuser pressure member includes a one-way clutch and is rotatable only in one direction to convey the two-ply sheet in a direction opposite to the sheet conveyance direction.

Aspect 9

In Aspect 9, an image forming system includes the sheet laminator according to any one of Aspect 1 to 8, and an image forming apparatus to form an image on a sheet medium to be fed to the sheet laminator.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator comprising:
a fuser pressurizer to thermally fix a two-ply sheet and a sheet medium inserted between two sheets of the two-ply sheet;
a conveyor configured to convey the two-ply sheet toward the fuser pressurizer in a sheet conveyance direction;
an operator manually rotatable to rotate the conveyor to guide the two-ply sheet outside a sheet conveyance passage in response to an occurrence of an abnormal stop of the sheet laminator; and
a guide configured to guide the two-ply sheet in the sheet conveyance passage between the conveyor and the fuser pressurizer,
wherein:
at least one of the fuser pressurizer or the conveyor is operable to guide the two-ply sheet outside the sheet conveyance passage in response to the occurrence of the abnormal stop of the sheet laminator,
the conveyor includes the operator, and
the operator is rotatable only in one direction to convey the two-ply sheet in the sheet conveyance direction.

2. The sheet laminator according to claim 1, wherein;
the fuser pressurizer includes the operator, and
the conveyor includes a pair of rollers separatable from each other.

3. The sheet laminator according to claim 1, wherein the guide includes:
a first guide; and
a second guide facing the first guide,
wherein:
one of the first guide or the second guide is movable between a guiding position at which the two-ply sheet is guided in the sheet conveyance passage in the sheet conveyance direction and an opening position at which the two-ply sheet is guided outside the sheet conveyance passage, and
the two-ply sheet moving outside the sheet conveyance passage moves the one of the first guide or the second guide from the guiding position to the opening position.

4. An image forming system comprising:
the sheet laminator according to claim 1; and
an image forming apparatus configured to form an image on the sheet medium to be fed to the sheet laminator.

5. The sheet laminator according to claim 1, wherein:
the fuser pressurizer includes a pair of rollers whose pressure against each other is decreasable.

6. A sheet laminator, comprising:
a fuser pressurizer to thermally fix a two-ply sheet and a sheet medium inserted between two sheets of the two-ply sheet;
a conveyor configured to convey the two-ply sheet toward the fuser pressurizer in a sheet conveyance direction;
an operator manually rotatable to rotate the conveyor to guide the two-ply sheet outside a sheet conveyance passage in response to an occurrence of an abnormal stop of the sheet laminator; and
a guide configured to guide the two-ply sheet in the sheet conveyance passage between the conveyor and the fuser pressurizer,
wherein:
at least one of the fuser pressurizer or the conveyor is operable to guide the two-ply sheet outside the sheet conveyance passage in response to the occurrence of the abnormal stop of the sheet laminator,
the fuser pressurizer includes the operator, and
the operator in the fuser pressurizer is rotatable only in one direction to convey the two-ply sheet in a direction opposite to the sheet conveyance direction.

7. The sheet laminator according to claim 6, wherein:
the conveyor includes a pair of rollers whose pressure against each other is decreasable.

8. An image forming system comprising:
the sheet laminator according to claim 6; and
an image forming apparatus configured to form an image on the sheet medium to be fed to the sheet laminator.

9. The sheet laminator according to claim 6, wherein:
the conveyor includes the operator, and
the fuser pressurizer includes a pair of rollers separatable from each other.

10. A sheet laminator, comprising:
a fuser pressurizer to thermally fix a two-ply sheet and a sheet medium inserted between two sheets of the two-ply sheet;
a conveyor configured to convey the two-ply sheet toward the fuser pressurizer in a sheet conveyance direction; and
a guide configured to guide the two-ply sheet in a sheet conveyance passage between the conveyor and the fuser pressurizer,
wherein:
at least one of the fuser pressurizer or the conveyor is operable to guide the two-ply sheet outside the sheet conveyance passage in response to an occurrence of an abnormal stop of the sheet laminator, and
the guide includes:
a first guide;
a second guide facing the first guide; and
a gap between the conveyor and an upstream end of one of the first guide or the second guide, the gap guiding the two-ply sheet outside the sheet conveyance passage.

11. An image forming system comprising:
the sheet laminator according to claim 10; and
an image forming apparatus configured to form an image on the sheet medium to be fed to the sheet laminator.

* * * * *